(No Model.)
J. F. & E. J. WILLIAMS.
COMBINED PLOW AND PLANTER.
No. 526,765. Patented Oct. 2, 1894.
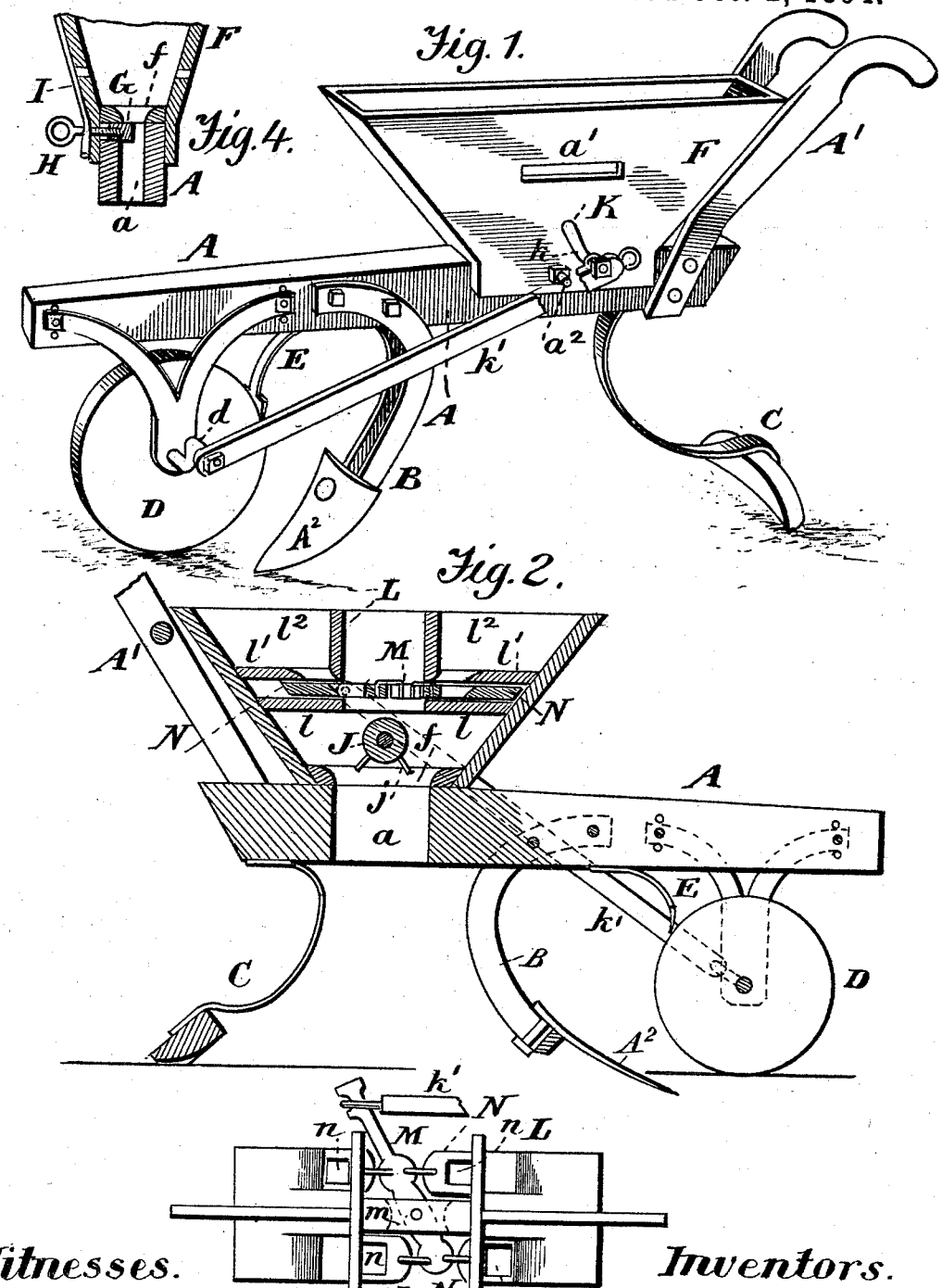
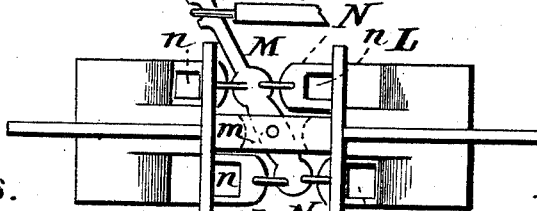
Witnesses.
A. Ruppert,
E. Zimmerman
Inventors.
James F. Williams,
Eli J. Williams,
Thomas P. Simpson,
atty.

UNITED STATES PATENT OFFICE.

JAMES F. WILLIAMS AND ELI J. WILLIAMS, OF KENNEDY, ALABAMA, ASSIGNORS TO BLANNERHASSETT H. SMOTHERS AND ROBERT M. SHEPHERD, OF SAME PLACE.

COMBINED PLOW AND PLANTER.

SPECIFICATION forming part of Letters Patent No. 526,765, dated October 2, 1894.

Application filed December 28, 1893. Serial No. 494,983. (No model.)

*To all whom it may concern:*

Be it known that we, JAMES F. WILLIAMS and ELI J. WILLIAMS, citizens of the United States, residing at Kennedy, in the county of Lamar and State of Alabama, have invented certain new and useful Improvements in a Combined Plow and Planter; and we do declare the following to be a full, clear, and exact description of the invention, such as will enable others skilled in the art to which it appertains to make and use the same, reference being had to the accompanying drawings, and to the letters of reference marked thereon, which form a part of this specificatian.

The special object of the invention is to make an agricultural implement which may be used for a plow, a cotton seeder and a drill for sowing grain with a fertilizer.

Figure 1 of the drawings is a perspective view, Fig. 2 a longitudinal vertical section, and Fig. 3 a detail plan view of drilling mechanism; Fig. 4, a cross section of hopper.

In the drawings, A represents the plow-beam; B, the furrow-opener standard; C, the coverer, and D the front wheel which in practice is adjustable in height to regulate the depth at which the seed shall be planted.

E is a scraper on the under side of the beam which is intended to keep the gage-wheel clear of dirt.

$a$ is a vertical slot in the beam, to register with the corresponding slot $f$ of the hopper F. Between this slot $f$ in the bottom of hopper and the slot $a$ in the beam is arranged a slide G which may be adjusted by a screw H to regulate the degree of feed for the seed, grain or fertilizer or by a pin behind whose head is placed a spring stop I.

The hopper F is made much larger than usual, in order to accommodate the mechanism shown in Fig. 3 of the drawings in the upper part thereof. Journaled in the sides of the hopper and near the bottom thereof is the agitator J which has teeth $j$ to work in the bottom-slot of the hopper, so as to facilitate the regular and free passage of the cotton seed, grain or fertilizer. The shaft K of the agitator has a crank $k$ on one end which is connected by a pitman $k'$ with the crank $d$ on the wheel so that the agitator may be oscillated by the axle of said wheel. Above the agitator shaft in the side of hopper is formed a slot $a'$ for the purpose hereinafter pointed out.

Without the hopper and seed-coverer, the beam A with its handles A' and plow $A^2$ may be used as a single-shovel plow, or with them and the hopper containing the agitator driven from the gage-wheel may be employed as a cotton planter. Now in order to make it also a grain seeder and fertilizer distributer we make the frame L beveled on its end so as to fit snugly in the hopper above the agitator and provide it with two parallel platforms $l\ l'$, the lower one $l$ having two opposite recesses which are over the bottom of the hopper, while the upper one $l'$ is divided at each end into two chambers $l^2\ l^2$ side by side, one for grain and one for fertilizer. Between these chambers is an open space, in which vibrates a lever M in a slot $a'$ of the middle of the frame L. At an equal distance on each side of the lever-fulcrum a pivoted double-hook connects said lever with a seed slide N having a cup-hole $n$ to regulate the quantity of grain and fertilizer to be dropped at one time. These cup-slides pass alternately under the chambers $l^2$ and over the recesses of platform $l$ so as to drop the grain and fertilizer into the bottom of hopper whence it goes through the slots $a\ f$ directly into the furrow or through a conducting spout. The end of the lever M is connected by an end-pivoted pitman with the crank on the axle of wheel so as to be vibrated thereby, the pitman connecting with the agitator being removed except when cotton-seed is to be drilled.

We preferably make the hopper which is detachable from the beam by a removal of the pin or screw $a^3$, about sixteen inches high from the top of beam; three inches wide at bottom and six inches at top so as to slope downwardly; length from five inches at bottom to twenty inches at top.

Having thus described all that is necessary to a full understanding of our invention, what we claim as new, and desire to protect by Letters Patent, is—

The planter attachment consisting of the frame L with two platforms $l\ l'$, the intermediate lever M and the fertilizer and seed slides pivotally connected with said lever and working under the bottom outlets of the seed and fertilizer chambers, in combination with the hopper of a cotton planter and fertilizer distributer as and for the purpose set forth.

In testimony whereof we affix our signatures in presence of two witnesses.

JAMES F. WILLIAMS.
ELI J. WILLIAMS.

Witnesses:
BENJIMEN E. THORNTON,
HOLLAND M. BELL.